United States Patent
Liu et al.

(10) Patent No.: US 9,673,956 B2
(45) Date of Patent: Jun. 6, 2017

(54) PRIORITIZED CHANNEL ACCESS SCHEMES WITH SPATIAL REUSE CONSIDERATION

(71) Applicant: MEDIATEK INC., Hsinchu (TW)

(72) Inventors: Jianhan Liu, San Jose, CA (US); Tianyu Wu, Fremont, CA (US); Rongsheng Huang, Fremont, CA (US); James June-Ming Wang, San Marino, CA (US)

(73) Assignee: MEDIATEK INC., Hsinchu (TW)

( * ) Notice: Subject to any disclaimer, the term of this patent is extended or adjusted under 35 U.S.C. 154(b) by 94 days.

(21) Appl. No.: 14/838,366

(22) Filed: Aug. 28, 2015

(65) Prior Publication Data

US 2016/0066257 A1 Mar. 3, 2016

Related U.S. Application Data

(60) Provisional application No. 62/043,538, filed on Aug. 29, 2014.

(51) Int. Cl.
| | |
|---|---|
| *H04W 4/00* | (2009.01) |
| *H04L 5/00* | (2006.01) |
| *H04W 28/18* | (2009.01) |
| *H04W 28/06* | (2009.01) |
| *H04W 74/00* | (2009.01) |
| *H04L 1/00* | (2006.01) |

(52) U.S. Cl.
CPC ............ *H04L 5/006* (2013.01); *H04W 28/18* (2013.01); *H04L 1/0003* (2013.01); *H04W 28/06* (2013.01); *H04W 74/00* (2013.01); *Y02B 60/50* (2013.01)

(58) Field of Classification Search
CPC ....................................................... H04L 5/006
See application file for complete search history.

(56) References Cited

U.S. PATENT DOCUMENTS

| 9,408,230 B2* | 8/2016 | Zhu | |
|---|---|---|---|
| 2005/0195786 A1* | 9/2005 | Shpak | H04W 52/08 370/338 |
| 2007/0286122 A1 | 12/2007 | Fonseca | 370/400 |

(Continued)

FOREIGN PATENT DOCUMENTS

| WO | WO2014044214 A1 | 3/2014 |
|---|---|---|
| WO | WO2014109867 A1 | 7/2014 |

OTHER PUBLICATIONS

International Search Report and Written Opinion of International Search Authority for PCT/CN2015/088399 dated Dec. 2, 2015 (11 pages).

*Primary Examiner* — Gerald Smarth
(74) *Attorney, Agent, or Firm* — Imperium Patent Works; Zheng Jin

(57) ABSTRACT

A spatial reuse prioritized channel access scheme is proposed to enhance the average throughput per station in a wireless network by optimizing spatial reuse. Spatial reuse capability (SRC) is defined as a monotonically decreasing function of co-channel interference signal strength from OBSSs. Higher spatial reuse capability can be transformed into higher data rate or less usage of airtime by using higher MCS or less interferences to OBSSs by reducing TX power. By allowing the stations that have larger spatial reuse capability to have higher probability to win channel access contention, the overall network throughput is enhanced.

20 Claims, 4 Drawing Sheets

(56) References Cited

U.S. PATENT DOCUMENTS

| | | | |
|---|---|---|---|
| 2008/0144493 A1* | 6/2008 | Yeh | H04W 52/50 370/230 |
| 2011/0306349 A1 | 12/2011 | Hakola et al. | 455/450 |
| 2013/0051382 A1* | 2/2013 | Derham | H04B 7/043 370/345 |
| 2014/0198741 A1 | 7/2014 | Barriac et al. | 370/329 |
| 2015/0195855 A1 | 7/2015 | Liu | 370/336 |

* cited by examiner

Table 7.2 Default EDCA access parameters for 802.11a, 802.11g, and 802.11n PHYs

| AC | CWmin | CWmax | AIFSN | TXOP limit |
|---|---|---|---|---|
| AC_BK | 31 | 1023 | 7 | 0 |
| AC_BE | 31 | 1023 | 3 | 0 |
| AC_VI | 15 | 31 | 2 | 3.008 ms |
| AC_VO | 7 | 15 | 2 | 1.504 ms |
| legacy | 15 | 1023 | 2 | 0 |

TO INCLUDE SPATIAL REUSE CAPABILITY INTO EDCA — 510

610

| SRC=RSSI (dBm) | < -72 | [-62, -72) | -[52, -62) | > -52 |
|---|---|---|---|---|
| w | 1 | 0.75 | 0.5 | 0 |

620

| SRC=RSSI (dBm) | < -72 | [-62, -72) | -[52, -62) | > -52 |
|---|---|---|---|---|
| p | 1 | 0.75 | 0.5 | 0 |

630

| SRC=RSSI (dBm) | < -72 | [-62, -72) | -[52, -62) | > -52 |
|---|---|---|---|---|
| v | $v\_1=1$ | $v\_2=3/2$ | $v\_3=2$ | HALT |

PRIORITIZED CHANNEL ACCESS SCHEMES WITH SPATIAL REUSE CONSIDERATION

CROSS REFERENCE TO RELATED APPLICATIONS

This application claims priority under 35 U.S.C. §119 from U.S. Provisional Application No. 62/043,538, entitled "Spatial Reuse Prioritized Channel Access Schemes for High Efficiency WLAN," filed on Aug. 29, 2014, the subject matter of which is incorporated herein by reference.

TECHNICAL FIELD

The disclosed embodiments relate generally to wireless network communications, and, more particularly, to prioritized Clear Channel Assessment (CCA) schemes with spatial reuse consideration in wireless communications systems.

BACKGROUND

IEEE 802.11 is a set of media access control (MAC) and physical layer (PHY) specification for implementing wireless local area network (WLAN) communication, called Wi-Fi, in the unlicensed (2.4, 3.6, 5, and 60 GHz) frequency bands. The standards and amendments provide the basis for wireless network products using the Wi-Fi frequency bands. For example, IEEE 802.11ac is a wireless networking standard in the 802.11 family providing high-throughput WLANs on the 5 GHz band. Significant wider channel bandwidths (20 MHz, 40 MHz, 80 MHz, and 160 MHz) were proposed in the IEEE 802.11ac standard. The High Efficiency WLAN study group (HEW SG) is a study group within IEEE 802.11 working group that will consider the improvement of spectrum efficiency to enhance the system throughput in high-density scenarios of wireless devices. Because of HEW SG, TGax (an IEEE task group) was formed and tasked to work on IEEE 802.11ax standard that will become a successor to IEEE 802.11ac.

In IEEE 802.11ac, a transmitter of a BSS (basis service set) of certain bandwidth is allowed to transmit radio signals onto the shared wireless medium depending on clear channel assessment (CCA) sensing and a deferral or backoff procedure for channel access contention. For a BSS of certain bandwidth, a valid transmission sub-channel shall have bandwidth, allowable in the IEEE 802.11ac, equal to or smaller than the full bandwidth of the BSS and contains the designated primary sub-channel of the BSS. Based on the CCA sensing in the valid transmission bandwidths, the transmitter is allowed to transmit in any of the valid transmission sub-channels as long as the CCA indicates the sub-channel is idle. This dynamic transmission bandwidth scheme allows system bandwidth resource to be efficiently utilized.

An enhanced distributed channel access protocol (EDCA) is used in IEEE 802.11ac as a channel contention procedure for wireless devices to gain access to the shared wireless medium, e.g., to obtain a transmitting opportunity (TXOP) for transmitting radio signals onto the shared wireless medium. The simple CSMA/CA with random back-off contention scheme and low cost ad hoc deployment in unlicensed spectrum have contributed rapid adoption of Wi-Fi systems. Typically, the EDCA TXOP is based solely on activity of the primary channel, while the transmit channel width determination is based on the secondary channel CCA during an interval (PIFS) immediately preceding the start of the TXOP. The basic assumption of EDCA is that a packet collision can occur if a device transmits signal under the channel busy condition when the received signal level is higher than CCA level.

Today, Wi-Fi devices are over-populated. Dense deployment has led to significant issues such as interference, congestion, and low throughput. Raising CCA levels has been shown to increase spatial re-use, which leads to significant increase in the network throughput in some dense deployment scenarios. In dense deployment scenario with multiple small BSS footprints in which APs and non-AP STAs are mostly exchanging frames at the highest MCS (modulation and coding), the baseline CCA level −82 dBm leads to excessive deferral and thus lower overall throughput. By increasing CCA level (OBSS interference) for all BSSs in the scenario, the operating SNR is still above the level required for max MCS. The specific link throughput does not degrade, but CCA deferral is reduced (likelihood of channel access increased) leading to increased network throughput.

In general, increasing CCA levels for inter-BSS packets can enhance the spatial reuse because more simultaneous transmissions can happen in multiple OBSSs. However, increasing CCA levels for inter-BSS packets may cause many stations that only support lower MCSs contends and win the channel access. As a result, network throughput is not optimized. This problem can be more severe if dynamic CCA rules are applied. To gain more opportunities to win channel access contention, every station is inclined to use the highest CCA level by reducing MCS such that overall network throughput can decrease dramatically. In worst scenarios, most packets are modulated with MCS0.

Consider a WLAN based on IEEE 802.11 standards. The CCA rules in IEEE 802.11a/g/n/ac only determine if a STA can contend for channel access or not. All STAB whose received signal strengths are below the CCA level have the equal probability to win the channel access through EDCA/CCA contention. However, in a dense WLAN, STAB at different locations very likely experience different interferences. If STA1 experiences more interference than STA2, then it is desirable that STA2 wins the channel access contention if both STA1 and STA2 have data to transmit. This is because STA2 is allowed to transmit with higher power than STA1 such that both introduce the similar amount of interference to OBSSs. STA2 is able to transmit with higher MCS than STA1 such that the network throughput is enhanced. Therefore, STA2 has larger spatial reuse capability, which can be transferred to higher MCS or less interference to OBSSs or power save.

It is thus desirable to have a channel access scheme with a channel contention that is favorable to stations with large spatial reuse capabilities.

SUMMARY

A spatial reuse prioritized channel access scheme is proposed to enhance the average throughput per station in a wireless network by optimizing spatial reuse. Spatial reuse capability (SRC) is defined as a monotonically decreasing function of co-channel interference signal strength from OBSSs. Higher spatial reuse capability can be transformed into higher data rate or less usage of airtime by using higher MCS or less interferences to OBSSs by reducing TX power. By allowing the stations that have larger spatial reuse capability to have higher probability to win channel access contention, the overall network throughput is enhanced.

In one embodiment, an initiating station detects a spatial reuse capability in a wireless communications network. The spatial reuse capability is associated with a co-channel interference signal strength from overlapping basic service sets (OBSSs). The initiating station performs a channel access procedure based on clear channel assessment (CCA) to gain access to a wireless channel. The channel access procedure is associated with multiple CCA levels and a set of parameters. The initiating station adjusts the set of parameters based on the detected spatial reuse capability such that a larger spatial reuse capability has higher probability to win the contention and access the wireless channel. In one example, the channel access procedure is based on an enhanced distributed channel access protocol (EDCA) defined in IEEE 802.11. The set of EDCA parameters comprises a contention permit probability, an initial counting down value, and a counting down speed.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
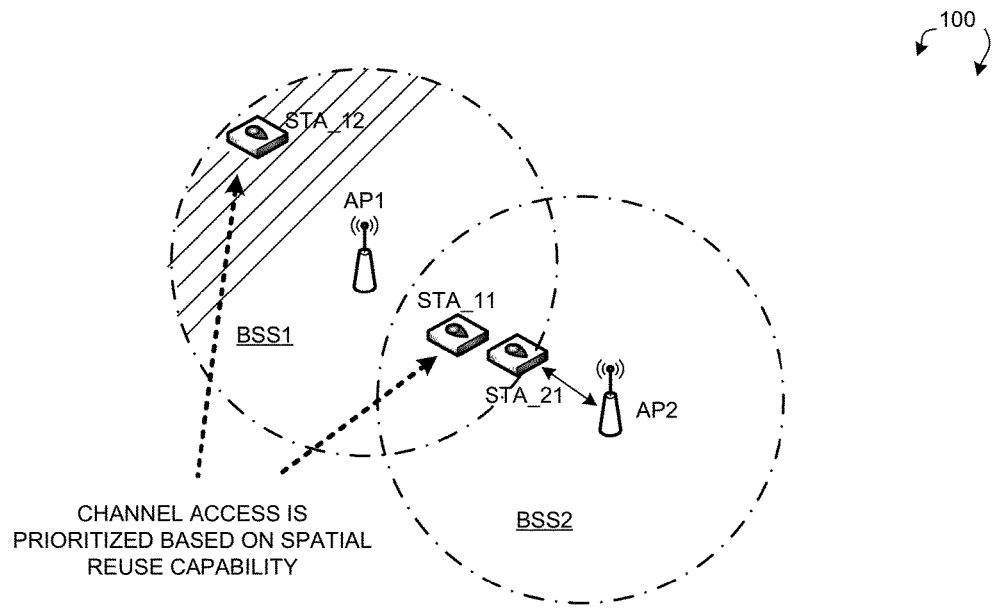
FIG. 1 illustrates a wireless network having overlapping BSS (OBSS) with prioritized channel access in accordance with one novel aspect.

FIG. 1 illustrates a wireless network having overlapping BSS (OBSS) with prioritized channel access in accordance with one novel aspect. Wireless network 100 comprises a plurality of wireless stations STA_11, STA_12, and STA_21. STA_11 and STA_12 belong to a first BSS1 having access point AP1, and STA_21 belongs to a second BSS2 having access point AP2. BSS1 and BSS2 are overlapping BSS (OBSS) with overlapping coverages. In the example of FIG. 1, STA_21 have gained the access to the wireless medium and have ongoing frame exchange with AP2. Meanwhile, STA_11 and STA_12 are trying to initiate a frame exchange with a target station.

In IEEE 802.11 wireless local area networks, an enhanced distributed channel access protocol (EDCA) is used as a channel contention procedure for wireless devices to gain access to the shared wireless medium, e.g., to obtain a transmitting opportunity (TXOP) for transmitting radio signals onto the shared wireless medium. The basic assumption of EDCA is that a packet collision can occur if a device transmits signal when the received signal level from OBSSs is higher than a predefined clear channel assessment (CCA) level. STAB are thus allowed to contend for channel access only when its received signal level from OBSSs is below the CCA level. Various CCA enhancements including raising CCA level and dynamic CCA level have been applied to deal with OBSS spatial reuse problem. However, a fixed higher CCA level is not optimum in all scenarios, and overall network throughput decreases if all STAB try to use the highest CCA level by reducing its MCS to gain more opportunities to transmit.

Consider wireless network 100 is a WLAN based on IEEE 802.11 standards. The CCA rules in IEEE 802.11a/g/n/ac only determine if an STA can contend for channel access or not. All STAB whose received signal strengths are below the CCA level have the equal probability to win the channel access through EDCA contention. For example, if the CCA level is −82 dBm, one STA who sees RSSI at −83 dBm has the same transmit probability as the other STA who sees RSSI at −94 dBm. On the other hand, all STAB who see their RSSI above −82 dBm have no transmission opportunity at all. Therefore, this one level CCA rule is not optimal even if the CCA level for OBSS is increased. Further, although almost all STAB can contend for channel access by reducing its transmitting power as far as minimum MCS is supported, the overall network throughput is not optimized.

Furthermore, in a dense WLAN, STAB at different locations very likely experience different interferences. In the example of FIG. 1, STA_11 experiences more interference than STA_12 because of the ongoing frame exchange between STA_21 and AP2 from BSS2. It is desirable that STA_12 win the channel access contention if both STA_11 and STA_12 have data to transmit. This is because STA_12 is allowed to transmit with higher power than STA_11 such that both introduce the similar amount of interference to OBSSs. STA_12 is able to transmit with higher MCS than STA_11 such that the network throughput is enhanced. Therefore, STA_12 has larger spatial reuse capability, which can be transferred to higher MCS or less interference to OBSSs or power save.

In one novel aspect, a spatial reuse prioritized channel access scheme is proposed to enhance the average throughput per STA by optimizing spatial reuse. Spatial reuse capability (SRC) is defined as a monotonically decreasing function of co-channel interference signal strength from OBSS, denoted as $RSSI_{OBSS}$. The co-channel interference signal strength from OBSS is indicated by an average received signal strength indicator (RSSI) or received channel power indicator (RCPI) from OBSS for a given time period. The smaller the RSSI/RCPI, the larger the spatial reuse capability. Alternatively, spatial reuse capability (SRC) can also be defined as a monotonically decreasing function of co-channel interference signal strength from OBSS, denoted as $RSSI_{OBSS}$, and the path-loss (PL) between the considered STA and its target destination. The smaller the RSSI/RCPI, the larger the spatial reuse capability. The smaller the PL, the larger the spatial reuse capability.

Referring back to FIG. 1, STA_12 has larger spatial reuse capability than STA_11 because STA_12 has smaller RSSI/RCPI from BSS2. Higher spatial reuse capability can be transformed into higher data rate or less usage of airtime by using higher MCS or less interferences to OBSSs by reducing TX power. No matter which option STA_12 choose, the whole network throughput is enhanced. Therefore, STA_12 should have higher channel access priority than STA_11 when BSS2 has concurrent transmissions. The proposed spatial reuse prioritized channel access scheme allows STAB with larger spatial reuse capability to have higher probability to win the channel access contention.

Figure 2:
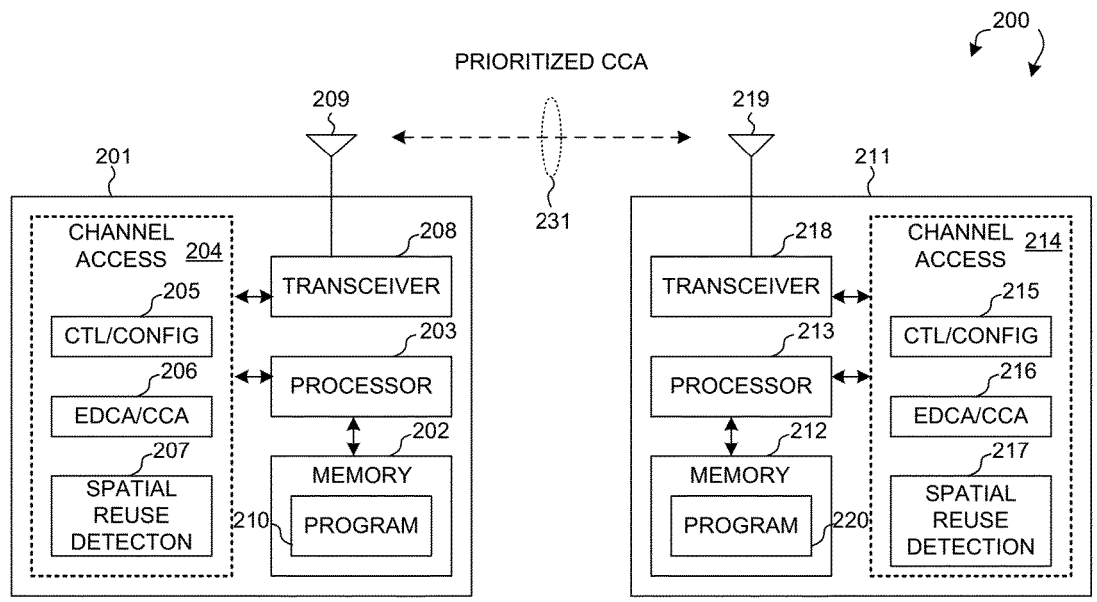
FIG. 2 is a simplified block diagram of an initiating device and a responding device in accordance with one novel aspect.

FIG. 2 is a simplified block diagram of an initiating device 201 and a responding device 211 in a wireless network 200 in accordance with one novel aspect. Initiating device 201 comprises memory 202, a processor 203, a channel access module 204 further comprising a control and configuration module 205, an EDCA/CCA module 206, and a spatial re-use detection module 207, and a transceiver 208 coupled to antenna 209. Similarly, responding device 211 comprises memory 212, a processor 213, a channel access module 214 further comprising a control and configuration module 215, an EDCA/CCA module 216, and a spatial re-use detection module 217, and a transceiver 218 coupled to antenna 219. In the transmitting direction, the transceiver converts received baseband signals from the processor to RF signals and sends out to the antenna. Similarly, in the receiving direction, the processor processes the received baseband signals from the transceiver and invoke different functional modules to be configured to perform various features supported by the wireless devices.

The different functional modules are circuits that can be implemented and configured in software, firmware, hardware, or any combination thereof. The functional modules, when executed by processors 203 and 213 (via program instructions 210 and 220 contained in memory 202 and 212), interwork with each other to allow the wireless devices to perform channel access with spatial re-use prioritization. For example, the spatial re-use detector 207 or 217 observes the wireless medium to measure the co-channel interference signal strength from OBSSs and detects spatial reuse capability, the EDCA module 206 or 216 contends the wireless medium for spatial re-use with other STAB through a random backoff EDCA procedure based on CCA level, and the control and configuration module 205 or 215 performs various control and configuration functionalities related to channel access such that spatial re-use frame exchange 231 based on prioritized CCA rule does not cause collision in the network.

Figure 3:
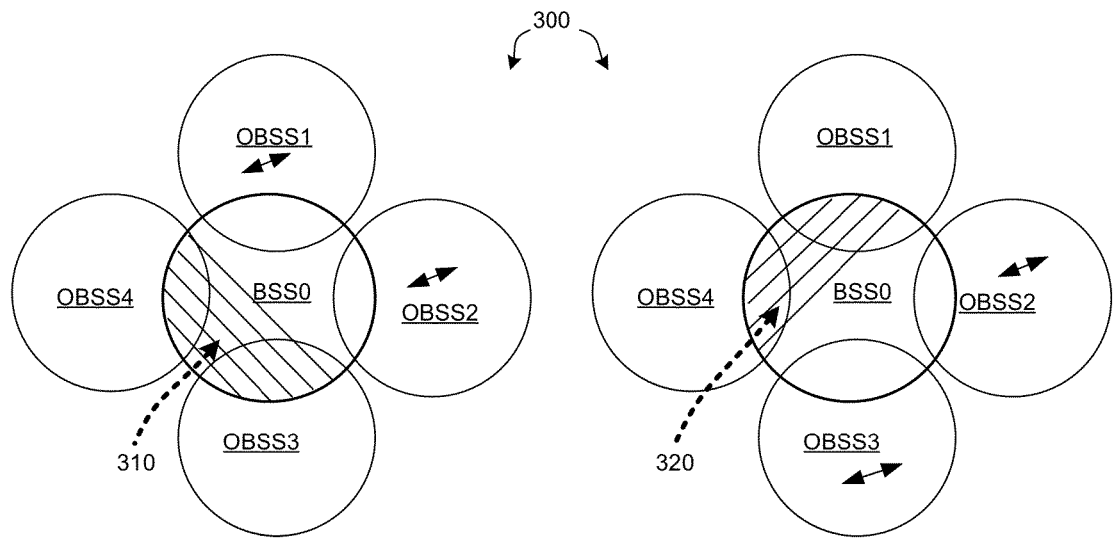
FIG. 3 illustrates an example of dynamic spatial reuse capability.

FIG. 3 illustrates an example of dynamic spatial reuse capability in a wireless local area network WLAN 300. WLAN 300 comprises a basic service set BSS0 with four overlapping BSSs OBSS1, OBSS2, OBSS3, and OBSS4. Interference from OBSSs is dynamic, so is the spatial reuse capability for different STAs. In a first scenario shown in the left diagram of FIG. 3, OBSS1 and OBSS2 have transmissions ongoing. As a result, in BSS0, STAs in the shaded area 310 have higher spatial reuse capability than STAs in the un-shaded area because STAs in shaded area 310 experience less interference from OBSS1 and OBSS2. In a second scenario shown in the right diagram of FIG. 3, OBSS2 and OBSS3 having transmissions ongoing. As a result, in BSS0, STAs in the shaded area 320 have higher spatial reuse capability than STAs in the un-shaded area because STAs in shaded area 320 experience less interference from OBSS2 and OBSS3. The existing schemes of raising CCA level or dynamic CCA just bring more STAs to contend for channel access but do not address who has larger probability to win the channel contention. On the other hand, the proposed channel access scheme enhances the average throughput per STA by adaptively modifying the channel access priority based on spatial reuse capability.

Figure 4:
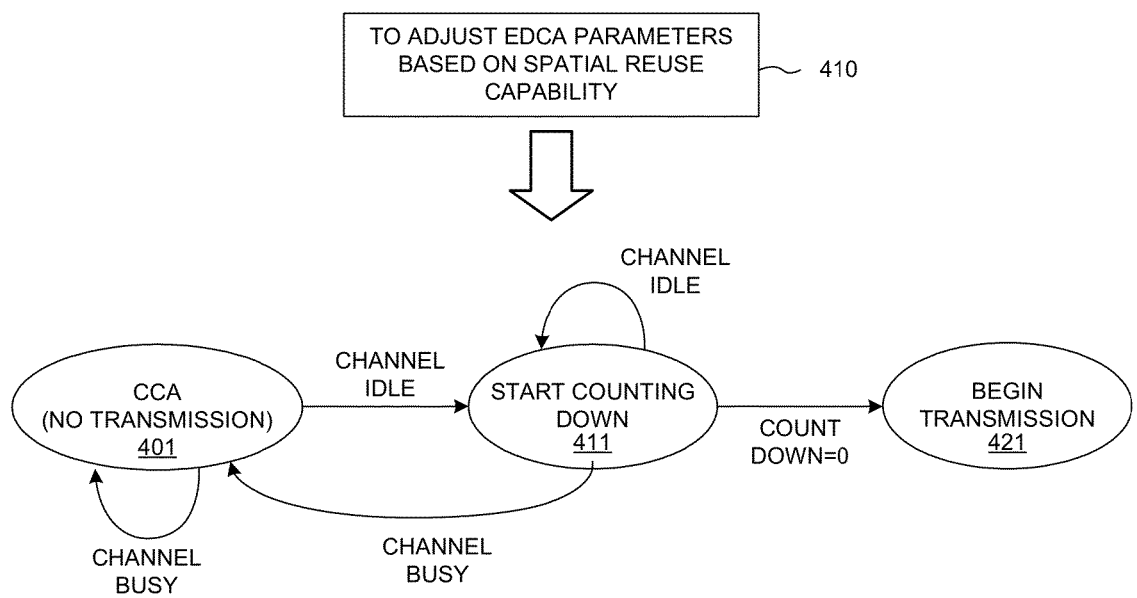
FIG. 4 illustrates an embodiment of a prioritized channel access procedure based on EDCA.

FIG. 4 illustrates an embodiment of a spatial reuse prioritized channel access procedure based on EDCA protocol in IEEE 802.11 WLAN. When initiating channel access, an initiating station starts with CCA (step 401), and measures the received signal strength RSSI for the wireless channel. The station then compares the signal strength with a predefined CCA level, and generates a CCA status. If RSSI is above the CCA level, then the CCA status is "Channel BUSY", and the station is not allowed to transmit. The station goes back to CCA (step 401). When the station sees RSSI is below the CCA level, then the CCA status is "Channel IDLE", and the station waits for AIFSN time slots and starts counting down (step 411). This is called the random backoff. The random backoff value is initially selected as a pseudo-random integer drawn from a uniform distribution over the interval [0, CW], where CW, an integer value, is the contention window. The contention window (CW) parameter takes the initial value CWmin and effectively doubles on each unsuccessful PDU transmission. If the CW reaches CWmax, it remains at that value until it resets. The CW reset to CWmin after every successful PDU transmission. During the counting down in step 411, the station keeps performing the CCA process. For example, in step 411, the station continues the CCA process. If the CCA status is "IDLE", the station stays in step 411 and continues to counting down the counter. On the other hand, if the CCA status is "BUSY", then the station goes back to step 401 for CCA and starts counting down again when channel becomes idle after waiting for another AIFSN time slots. Finally, when the counting down reaches zero, the station gains access and begins transmission over the wireless channel (step 421). The above-illustrated EDCA procedure is associated with a set of EDCA parameters including counting down speed etc. With spatial reuse prioritized EDCA schemes, the set of EDCA parameters are adjusted to adapt to OBSS interference scenarios and optimize spatial reuse (step 410).

Figures 5, 6:
FIG. 5 illustrates the default EDCA access parameters for 802.11.
FIG. 6 illustrates different embodiments of prioritized channel access based on EDCA.

FIG. 5 illustrates the default EDCA access parameters for 802.11. Different parameters are assigned to different types of data traffic categories for channel contention to provide quality of service (QoS). For the same traffic category, every STA has the same parameters for channel access contention. For spatial reuse prioritized EDCA schemes, the spatial reuse capability (SRC) of the initiating station is taken into account into EDCA. In general, each STA should have different probability to win the channel access contention based on its spatial reuse capability. The STA who has higher spatial reuse capability should have larger probability to win the channel access contention. The contention of channel access is still EDCA based, and the EDCA parameters in FIG. 5 remain unchanged for success of Wi-Fi, backward compatibility, and QoS. However, spatial reuse capability (SRC) is included into EDCA in the spatial reuse prioritized EDCA schemes (step 510).

Different spatial reuse prioritized EDCA schemes are proposed. In a first scheme, the counting down speed is differentiated according to each STA's SRC. In a second scheme, a contention permit probability is introduced for different STAB with different SRC. In a third scheme, the initial counting down value is adjusted according to each STA's SRC. In general, spatial reuse capability (SRC) is defined as a monotonically decreasing function of co-channel interference signal strength from OBSS, denoted as $RSSI_{OBSS}$, i.e., $SRC=f(RSSI_{OBSS})$. For example, one simple spatial reuse capability metric can be $SRC=C-\alpha*RSSI_{OBSS}$, where C is a constant and $\alpha$ is a positive real number. Spatial reuse capability SRC can also be defined as a monotonically decreasing function of co-channel interference signal strength from OBSS, denoted as $RSSI_{OBSS}$, and the path-loss (PL) between the considered STA and its target destination, i.e., $SRC=f(RSSI_{OBSS}, PL)$. For example, one simple spatial reuse capability metric can be SRC=C−α*RSSI$_{OBSS}$−β*PL, wherein C is a constant, α and β are both positive real numbers. In the following examples, spatial reuse capability SRC is directly linked to RSSI$_{OBSS}$ for simplicity.

FIG. 6 illustrates different embodiments of spatial reuse prioritized EDCA schemes to be applied for IEEE 802.11ax STAB, which are also referred to as high efficiency (HE) STAB. In a first embodiment (scheme 1), the counting down speed is differentiated according to each STA's SRC. As depicted by table 610, a counting down correction factor w is introduced to STA, enabling different counting down speed for different STAB based on their own spatial reuse capability of this STA, i.e., w=f(SRC). For example, if the original counting down speed is s, which means counting down s for each time slot, then the new counting down speed is w*s. The basic concept of counting down speed control is to allow the STAB that have larger spatial reuse capability to have higher probability to win the channel access contention.

In the example of table 610, a simple piecewise setting for w can be defined directly based on SRC=RSSI. Three different CCA levels with CCA1=−72 dBm, CCA2=−62 dBm, and CCA3=−52 dBm are defined. The counting down correction factor w=1 when RSSI<CCA1, w=0.75 when CCA2≤RSSI<CCA1, w=0.5 when CCA3≤RSSI<CCA2, and w=0 when RSSI≥CCA3. This way, STAB with larger SRC have a faster counting down speed while STAB with smaller SRC have a slower counting down speed. As a result, channel access probability is directly adapted to OBSS interference. Note that as compared to legacy STAB, there is only one CCA level, and the CCA rule is w=1 when RSSI<CCA, and w=0 when RSSI≥CCA. By adjusting the counting down correction factor w, we can balance the advantage between IEEE 802.11ax device and legacy devices. We can even let w=1 for HE devices to gain some channel access advantages than non-HE devices. This scheme also maximizes spatial reuse and improves overall network throughput. Note that the counting down correction factor w is dynamically adjusted at each count down during the entire EDCA process. As a result, channel access probability is dynamically adapted to real-time OBSS interference scenarios.

In a second embodiment (scheme 2), a contention permit probability is introduced for different STAB with different SRC. In this scheme, each STA has a probability p for channel access contention permit according to its SRC. In the example of table 620, a simple piecewise setting for p can be defined directly based on SRC=RSSI. A STA will toss a coin according to its p to decide if it is allowed to count down (contend) for a given period. Three different CCA levels with CCA1=−72 dBm, CCA2=−62 dBm, and CCA3=−52 dBm are defined. The probability for channel access contention permit p=1 when RSSI<CCA1, p=0.75 when CCA2≤RSSI<CCA1, p=0.5 when CCA3≤RSSI<CCA2, and p=0 when RSSI≥CCA3. This way, STAB with larger SRC have a higher probability to be allowed to contend for channel access while STAB with smaller SRC have a smaller probability to be allowed to contend for channel access. As a result, channel access probability is directly adapted to OBSS interference.

In a third embodiment (scheme 3), the initial counting down value is adjusted according to each STA's SRC. In this scheme, a group of counter value correction factors v is defined as a function of spatial reuse capability, i.e., v=g (SRC). The counting down speed for HE STA is the same legacy STAB, but the value in the counter changes according to correction factors v when start counting down. The basic idea for correction factor v is to increase the counter value of STA when the spatial reuse capability for that STA is small. In the example of table 630, a simple piecewise setting for v can be defined directly based on SRC=RSSI. Three different CCA levels with CCA1=−72 dBm, CCA2=−62 dBm, and CCA3=−52 dBm are defined. The group of counter value correction factors v1=1 when RSSI<CCA1, v_2=3/2 when CCA2≤RSSI<CCA1, v.3=2 when CCA3≤RSSI<CCA2, and HALT when RSSI≥CCA3. This way, STAB with larger SRC have a smaller counting down value for channel access while STAB with smaller SRC have a larger counting down value for channel access. In HALT state, no contention is allowed and counter value remains unchanged. As a result, channel access probability is directly adapted to OBSS interference.

Figure 7:
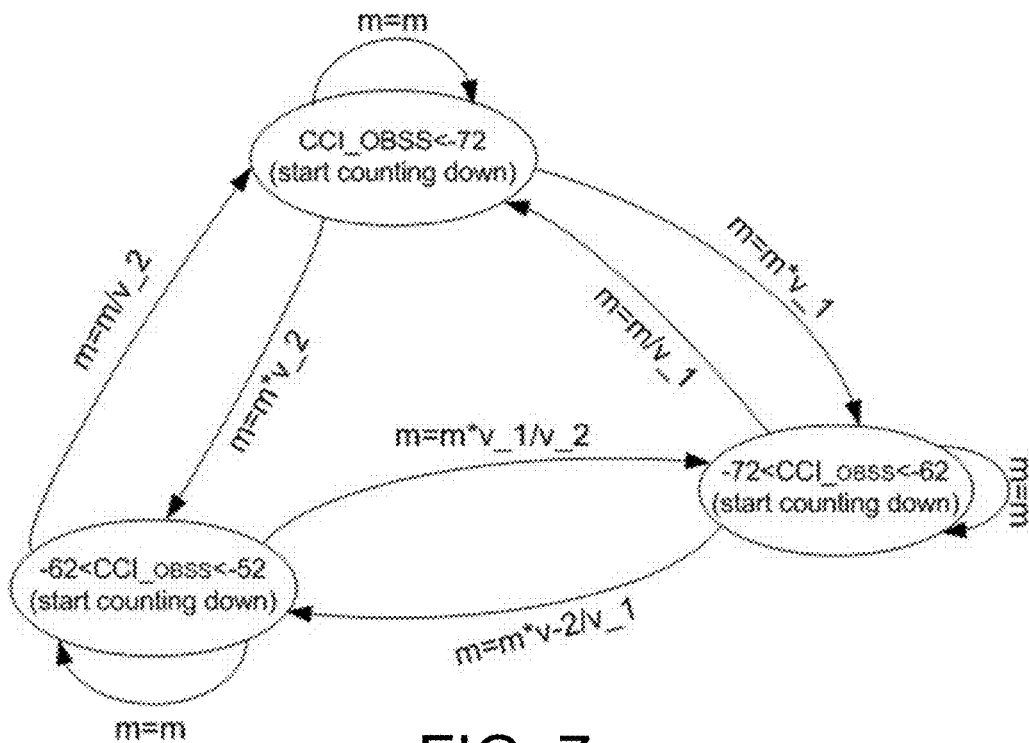
FIG. 7 is one example of adjusting counter value based on spatial reuse capability.

FIG. 7 is one example of adjusting counter value based on spatial reuse capability. The counter value before start counting down for a specific access category (AC) is m, where m is a non-negative integer, and m=R(m*b1/b2), where R(n) stands for rounding of integer n, operator * stands for multiplication and operator/stands for divide. For instance, one design can have CCA1=−72 dBm, CCA2=−62 dBm, CCA3=−52 dBm, b1=3, and b2=2.In any state, if a STA sees RSSI>CCA3, it halts the counting down process until it sees RSSI≤CCA3 again.

In another embodiment, counting down speed factor w, contention permit probability p, and/or counter value correction factors v can be controlled by the AP in the BSS. For example, AP can broadcast counting down speed factor w in the beacon to set the channel access prioritized rule for SRAs within the BSS. In such embodiment, counting down speed factor w can be different for STAB in different OBSSs even they encounter the same spatial reuse capability. For instance, counting down speed factor w can be adjusted by an AP to provide better fairness of HE STAB and non-HE STAB if there are mixed STAB in the BSS.

Figure 8:
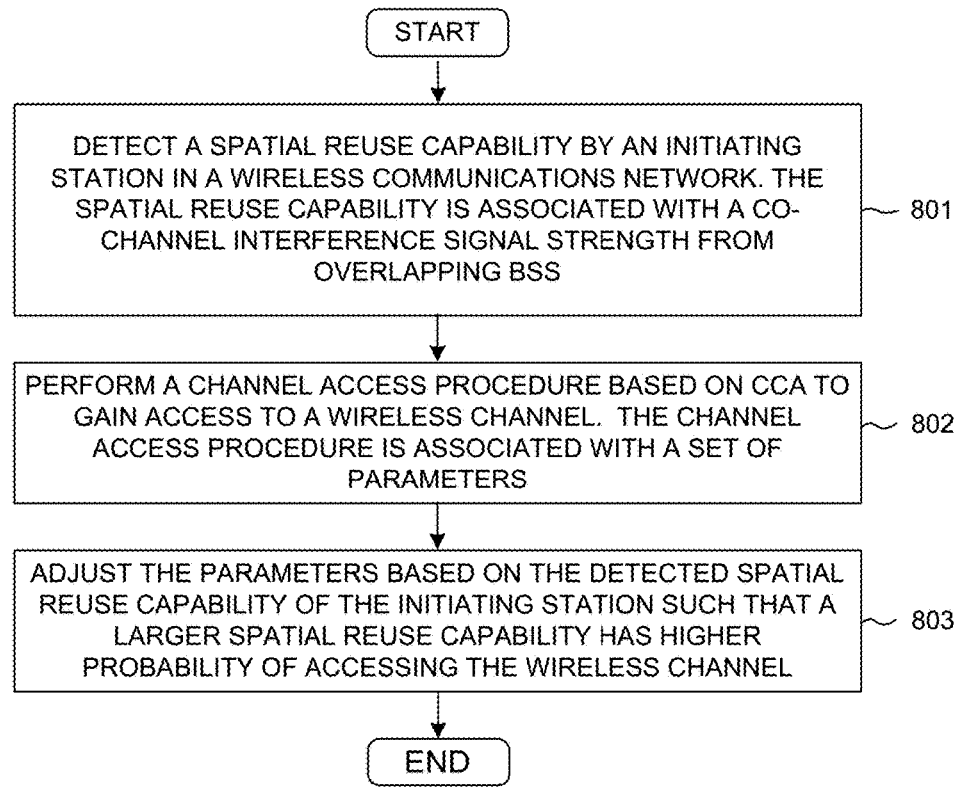
FIG. 8 is a flow chart of a method of prioritized channel access based on spatial reuse capability in accordance with one novel aspect.

FIG. 8 is a flow chart of a method of prioritized channel access based on spatial reuse capability in accordance with one novel aspect. In step 801, an initiating station detects a spatial reuse capability in a wireless communications network. The spatial reuse capability is associated with a co-channel interference signal strength from overlapping basic service sets (OBSSs). In step 802, the initiating station performs a channel access procedure based on clear channel assessment (CCA) to gain access to a wireless channel. The channel access procedure is associated with multiple CCA levels and a set of parameters. In step 803, the initiating station adjusts the set of parameters based on the detected spatial reuse capability such that a larger spatial reuse capability has higher probability to win the contention and access the wireless channel.

The spatial reuse capability is a function of an average received signal strength indicator or received channel power indicator (RSSI/RCPI) from the OBSS. Alternatively, the spatial reuse capability is a function of an average received signal strength indicator or received channel power indicator (RSSI/RCPI) from the OBSS and a pathloss between the initiating station and a target station. In one example, the channel access procedure is based on an enhanced distributed channel access protocol (EDCA) defined in IEEE 802.11. The set of parameters comprises a contention permit probability, an initial counting down value, and a counting down speed.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    detecting a spatial reuse capability by an initiating station in a wireless communications network, wherein the spatial reuse capability is associated with a co-channel interference signal strength from overlapping basic service sets (OBSSs);
    performing a channel access procedure based on clear channel assessment (CCA) to gain access to a wireless channel, wherein the channel access procedure is associated with multiple CCA levels and a set of parameters; and
    adjusting the set of parameters based on the detected spatial reuse capability of the initiating station such that a lager spatial reuse capability station has a higher probability of accessing the wireless channel.

2. The method of claim 1, wherein the spatial reuse capability is a function of an average received signal strength indicator or received channel power indicator (RSSI/RCPI) from the OBSS.

3. The method of claim 1, wherein the spatial reuse capability is a function of an average received signal strength indicator or received channel power indicator (RSSI/RCPI) from the OBSS and a pathloss between the initiating station and a target station.

4. The method of claim 1, wherein the channel access procedure is based on an enhanced distributed channel access protocol (EDCA) defined in IEEE 802.11.

5. The method of claim 4, wherein the EDCA involves comparing the co-channel interference signal strength from the OBSS with a CCA level and starting a counting down procedure before transmitting radio signals in the wireless channel.

6. The method of claim 5, wherein the set of parameters is dynamically adjusted during the counting down procedure.

7. The method of claim 5, wherein the set of parameters comprises a contention permit probability, an initial counting down value, and a counting down speed.

8. The method of claim 7, wherein the initiating station adjusts the counting down speed based on the spatial reuse capability.

9. The method of claim 7, wherein the initiating station adjusts the contention permit probability based on the spatial reuse capability.

10. The method of claim 7, wherein the initiating station adjusts the initial counting down value based on the spatial reuse capability.

11. A wireless device, comprising:
    a detector that detects a spatial reuse capability in a wireless communications network, wherein the spatial reuse capability is associated with a co-channel interference signal strength from overlapping basic service sets (OBSSs); and
    a channel access module that performs a channel access procedure to gain access to a wireless channel based on clear channel assessment (CCA), wherein the channel access procedure is associated with multiple CCA levels and a set of parameters, and wherein the channel access module adjusts the parameters based on the detected spatial reuse capability of the wireless device such that a larger spatial reuse capability station has a higher probability of accessing the wireless channel.

12. The device of claim 11, wherein the spatial reuse capability is a function of an average received signal strength indicator or received channel power indicator (RSSI/RCPI) from the OBSS.

13. The device of claim 11, wherein the spatial reuse capability is a function of an average received signal strength indicator or received channel power indicator (RSSI/RCPI) from the OBSS and a pathloss between the wireless device and a target station.

14. The device of claim 11, wherein the channel access procedure is based on an enhanced distributed channel access protocol (EDCA) defined in IEEE 802.11.

15. The device of claim 14, wherein the EDCA involves comparing the co-channel interference signal strength from the OBSS with a CCA level and starting a counting down procedure before transmitting radio signals in the wireless channel.

16. The device of claim 15, wherein the set of parameters is dynamically adjusted during the counting down procedure.

17. The device of claim 15, wherein the set of parameters comprises a contention permit probability, an initial counting down value, and a counting down speed.

18. The device of claim 17, wherein the wireless device adjusts the counting down speed based on the spatial reuse capability.

19. The device of claim 17, wherein the wireless device adjusts the contention permit probability based on the spatial reuse capability.

20. The device of claim 17, wherein the wireless device adjusts the initial counting down value based on the spatial reuse capability.

* * * * *